United States Patent [19]

Togano et al.

[11] Patent Number: 5,431,267
[45] Date of Patent: Jul. 11, 1995

[54] LOCK RELEASE APPARATUS

[75] Inventors: Norio Togano, Kosai; Katsunori Shirahama, Atsugi; Shunsuke Ikushima, Kawasaki; Takehiro Kuroda, Atsugi; Shuichi Hannya, Fujisawa, all of Japan

[73] Assignees: Nissan Motor Co., Ltd., Yokohama; Fuji Kiko Co., Ltd., Tokyo, both of Japan

[21] Appl. No.: 189,779

[22] Filed: Feb. 1, 1994

[30] Foreign Application Priority Data

Feb. 2, 1993 [JP] Japan .................. 5-015405

[51] Int. Cl.6 ............. B60K 41/26; F16H 59/10
[52] U.S. Cl. ..................... 192/4 A; 74/475; 74/529; 180/271
[58] Field of Search ............ 192/4 A; 180/271; 74/479 PM, 529, 475; 70/455

[56] References Cited

U.S. PATENT DOCUMENTS

| | | | |
|---|---|---|---|
| 1,272,072 | 7/1918 | Madsen | 70/455 X |
| 1,382,183 | 6/1921 | Fekete | 70/455 X |
| 4,909,096 | 3/1990 | Kobayashi | 192/4 A X |
| 5,016,738 | 5/1991 | Shirahama et al. | |
| 5,150,593 | 9/1992 | Kobayashi et al. | 192/4 A X |
| 5,186,069 | 2/1993 | Asano et al. | 192/4 A X |
| 5,187,999 | 2/1993 | Kobayashi et al. | 192/4 A X |
| 5,195,342 | 3/1993 | Werner | 70/455 X |
| 5,207,740 | 5/1993 | Ikushima et al. | 192/4 A |
| 5,255,570 | 10/1993 | Shirahama et al. | 192/4 A X |
| 5,309,744 | 5/1994 | Kito et al. | 192/4 A X |

FOREIGN PATENT DOCUMENTS 4-29154 7/1992 Japan .

Primary Examiner—Rodney H. Bonck
Attorney, Agent, or Firm—Lowe, Price, Leblanc & Becker

[57] ABSTRACT

A lock release apparatus includes a gear shift lever assembly including a gear shift lever having a plurality of positions including a parking position, and a detent mechanism shiftable into a detent position wherein said gear shift lever is allowed to move out of the parking position. A lock bushing is supported on the gear shift lever, and has a lock position in which the detent mechanism is prevented from shifting into the detent position and a lock release position in which the detent mechanism is allowed to shift into the detent position. A manual lock release rod is accommodated in a casing secured to the gear shift lever. A screw is fitted into an opening of the casing to prevent an access to the manual lock release, and covered by a lid. The screw is engaged with and disengaged from the opening by using a tool.

4 Claims, 9 Drawing Sheets

LOCK RELEASE APPARATUS

BACKGROUND OF THE INVENTION

The present invention relates to a lock release apparatus for use in a vehicle, for example, a vehicle having an automatic transmission.

U.S. Pat. No. 5,016,738 issued on May 21, 1991 to Shirahama et al. discloses a lock release apparatus for automatic transmission vehicles. The lock release apparatus disclosed includes a gear shift lever having a plurality of positions including a parking position, and a detent mechanism shiftable into a detent position wherein the gear shift lever is allowed to move out of the parking position. A solenoid-operated bushing is provided for driving the detent mechanism and has a lock position in which the detent mechanism is prevented from shifting into the detent position and a lock release position in which the detent mechanism is allowed to shift into the detent position. A manual lock release member is provided in a readily accessible manner for moving the bushing out of the lock release position in such a case that the bushing fails to shift into the lock release position due to any mechanical or electrical problem of the solenoid.

SUMMARY OF THE INVENTION

An object of the present invention is to provide an improved lock release apparatus wherein an access to a manual lock release member is limited.

According to one aspect of the present invention, there is provided a lock release apparatus comprising:
- a gear shift lever assembly including a gear shift lever having a plurality of positions including a parking position, and a detent mechanism shiftable into a detent position wherein said gear shift lever is allowed to move out of said parking position;
- a lock having a lock position in which the detent mechanism is prevented from shifting into the detent position and a lock release position in which the detent mechanism is allowed to shift into the detent position;
- means adapted for conditioning the lock into the lock release position;
- a manual lock release for the lock;
- means for preventing an access to the manual lock release, the preventing means including an opening arranged to allow an access to the manual lock release; and
- a lid covering the opening.

DESCRIPTION OF THE PREFERRED EMBODIMENT

Figure 1:
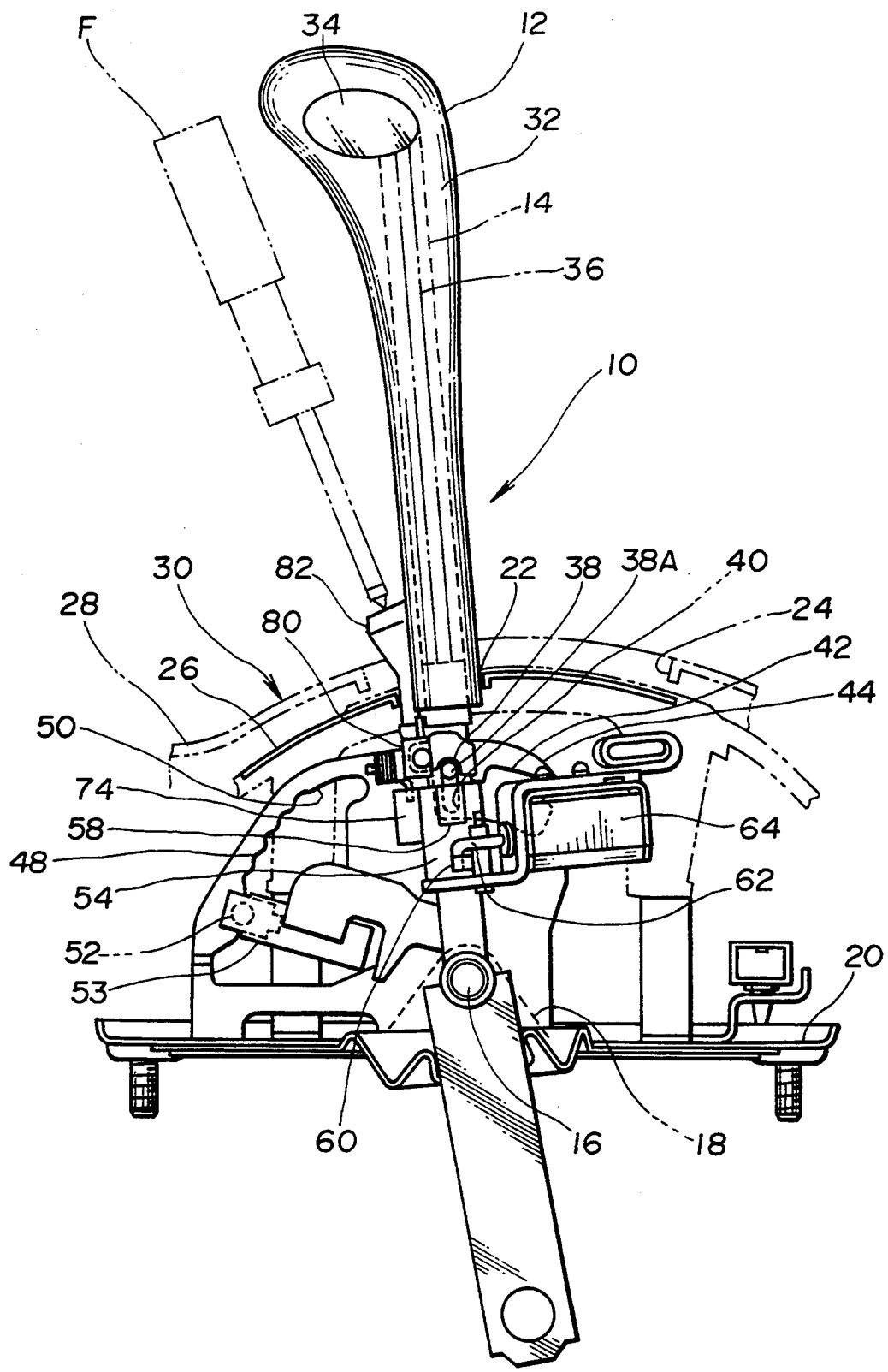
FIG. 1 is an elevation partly in section depicting a lock release apparatus according to the present invention.

Referring now to FIG. 1, there is shown a lock release apparatus for a vehicle equipped with an automatic transmission, including a gear shift lever assembly 10. The gear shift lever assembly 10 includes a gear shift lever 12 as seen in FIG. 1, which is shiftable into a plurality of positions including a parking position.

As shown in FIG. 1, the gear shift lever 12 includes a hollow cylindrical shaft 14 pivotally supported by a pin 16 on a bracket 18. The bracket 18 is fixed on a base plate 20 secured to a vehicle floor (not shown). The hollow cylindrical shaft 14 has an upper portion projecting upwardly as viewed in FIG. 1, through openings 22 and 24 which are respectively formed on curved surfaces of a slide panel 26 and an indicator panel 28 of a shifter assembly case 30. The upper portion of the hollow cylindrical shaft 14 is received in a hollow knob 32 as seen in FIG. 1.

Figure 2:
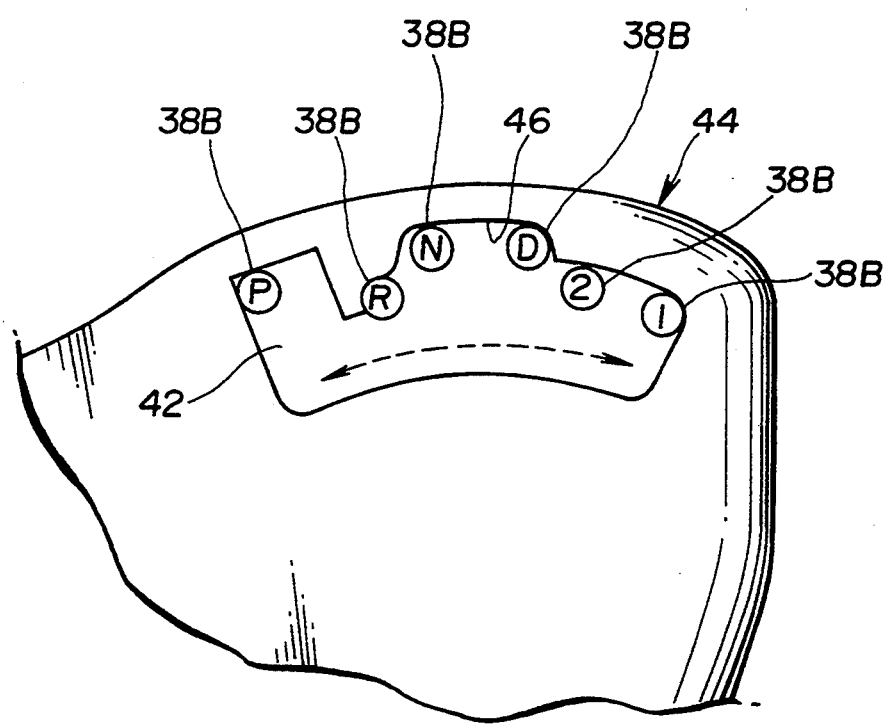
FIG. 2 is a schematic view of a position plate used in the lock release apparatus.

The gear shift lever assembly 10 also includes a detent mechanism shiftable into a detent position wherein the gear shift lever 12 is allowed to move out of the parking position. The detent mechanism includes a push button 34 which is arranged in the knob 32 as seen in FIG. 1. The push button 34 is so constructed as to be retractable into the knob 32 when depressed. The push button 34 is engagedly connected with one end of a compression rod 36. The compression rod 36 is slidably received in the hollow cylindrical shaft 12 to move downwardly as viewed in FIG. 1 by depressing the push button 34. The compression rod 36 has the other end connected with a coil spring (not shown) and biased upwardly as viewed in FIG. 1. A position pin 38 is fixed to the lower end of the compression rod 36. The position pin 38 has opposite ends projecting radially outwardly from a pair of diametrically opposed slots 40 formed on the hollow cylindrical shaft 12. FIG. 1 shows one end 38A of the position pin 38 projecting from one of the slots 40. As seen in FIG. 2, the other end 38B of the position pin 38 is engaged with an opening 42 of a position plate 44 secured to the base plate 20.

As best shown in FIG. 2, a plurality of cuts 46 are disposed along a peripheral edge of the opening 42 of the position plate 44. The cuts 46 define positions including parking "P", reverse "R", neutral "N", drive "D", second gear "2" and first gear "1" positions, respectively.

Thus, the detent mechanism for the gear shift lever 12 is constituted as described above.

Numeral 48 denotes a wavy cam surface 48 disposed along a peripheral edge of an opening 50 which is formed spaced from the opening 42 leftward as viewed in FIG. 1. The cam surface 48 is engaged by a check ball 52 biassingly supported in a tube 53 which is connected with the hollow cylindrical shaft 14.

As shown in FIG. 1, an annular lock bushing 54 is concentrically and rotatably supported on a lower portion of the hollow cylindrical shaft 14. The lock bushing 54 is formed at an upper end portion thereof with a pair of diametrically opposed notches 58 engageable with the position pin 38 of the compression rod 36.

Figure 7:
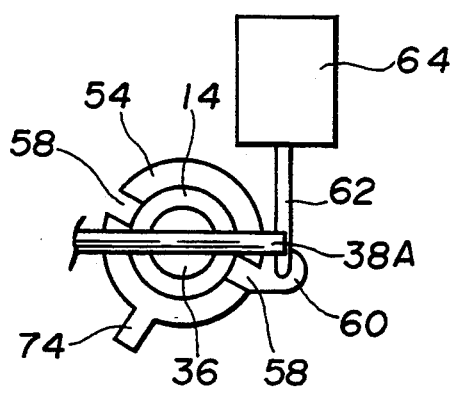
FIG. 7 is a sectional view taken along the line VII—VII of FIG. 3, showing a lock bushing in a lock position.
Figure 8:
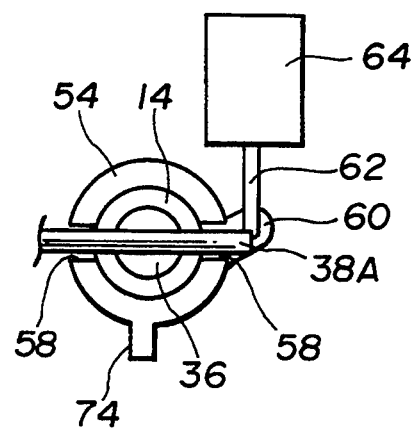
FIG. 8 is a view similar to FIG. 7 but showing the lock bushing in a lock release position.

As best shown in FIG. 7, the lock bushing 54 has the lock position in which the notches 58 are misaligned with the position pin 38. The end 38B of the position pin 38 is placed in the parking position "P" on the position plate 44. In this lock position, the detent mechanism is prevented from shifting into the detent position whereby the gear shift lever 12 is locked in the parking position. The lock bushing 54 also has a lock release position in which the notches 58 are aligned with the position pin 38 as seen in FIG. 8. In the lock release position, the detent mechanism is allowed to shift into the detent position whereby the gear shift lever 12 is allowed to move out of the parking position to other positions.

Figure 3:
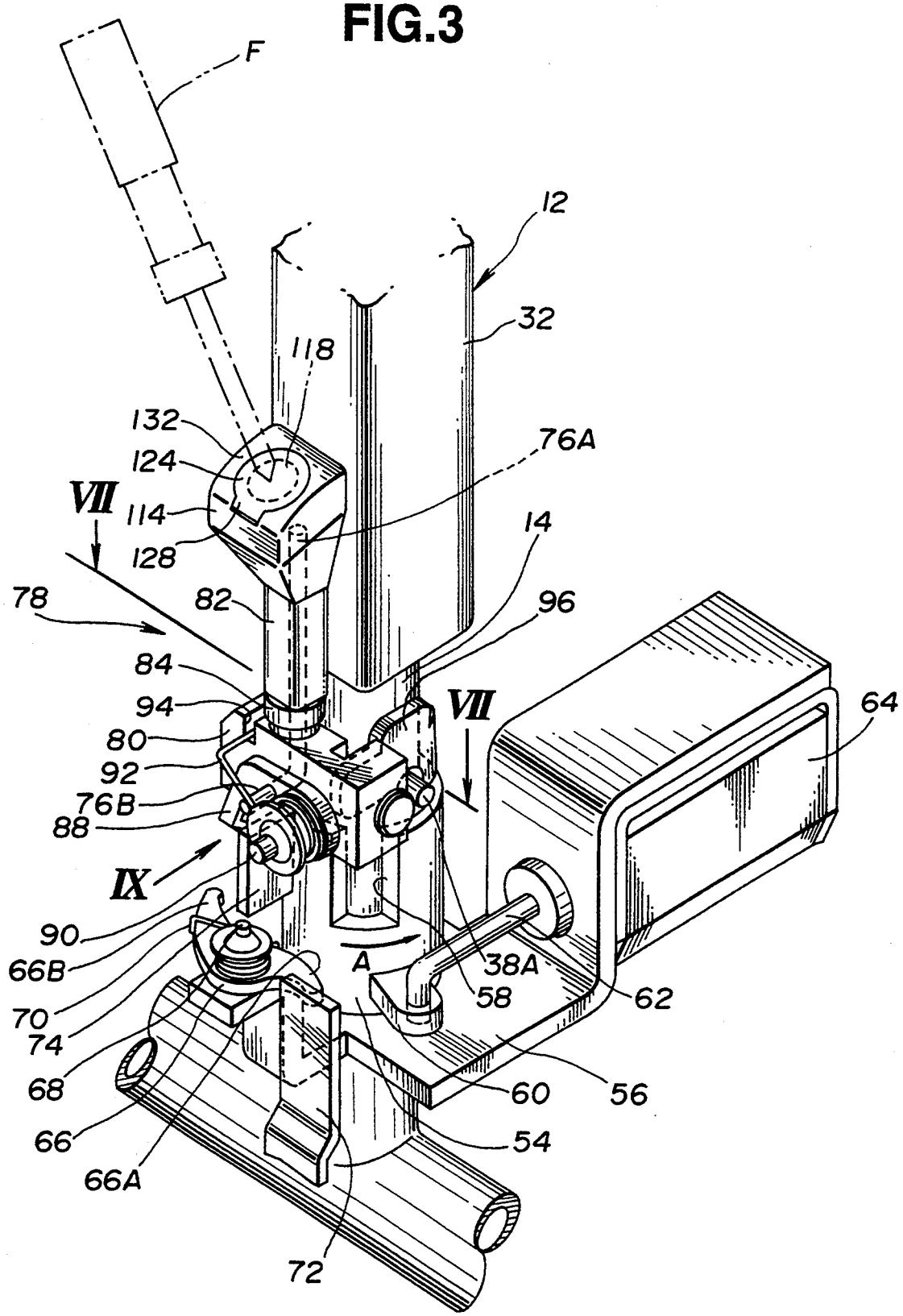
FIG. 3 is a perspective view showing a principal part of the lock release apparatus.

Referring back to FIG. 3, a hook end of a rod 62 projecting from a solenoid 64 is operatively connected with an outwardly protrudent portion 60 which is formed on a peripheral wall of the lock bushing 54. The solenoid 64 is supported by a bracket 56 secured to the hollow cylindrical shaft 14. The solenoid 64 is so designed as to be energized in a case where an ignition key is in an ON position and a brake is actuated. When the solenoid 64 is deenergized, the rod 62 projects outwardly from the solenoid 64 to hold the lock bushing 54 in the lock position as seen in FIGS. 3 and 7. When the solenoid 64 is energized, the rod 62 retracts into the solenoid 64 to rotate the lock bushing 54 in a direction as indicated by the arrow A of FIG. 3. Then, the lock bushing 54 is moved to the lock release position as seen in FIG. 8.

As shown in FIG. 3, a rotary lever 66 is rotatably supported about a pin 68 on the bracket 56 and biased in the clockwise direction by a coil spring 70 mounted on the pin 68. The rotary lever 66 has a pair of opposed arms 66A and 66B as seen in FIG. 3. When the lock bushing 54 is in the lock position, the arm 66A abuts against a stopper 72 secured to the vehicle floor and the other arm 66B is disengaged from an radially outwardly extending flange 74 of the lock bushing 54. When the lock bushing 54 is in the lock release position and the gear shift lever 12 is moved out of the parking position, the rotary lever 66 is moved remote from the stopper 72. The arm 66A is disengaged from the stopper 72 and the arm 66B urges the radially outwardly extending flange 74 in the clockwise direction.

As seen in FIG. 3, an L-shaped manual lock release rod 76 as indicated in a phantom line is received in a casing 78 which is secured to the gear shift lever 12. The casing 78 includes a base block 80 with a through-hole, a hollow post block 82 and an annular washer 84 interposed therebetween. The base block 80, the hollow post block 82 and the annular washer 84 cooperate with each other to define a bore in which the manual lock release rod 76 is received. The manual lock release rod 76 has one end 76A disposed in the post block 82 and the other end 76B projecting outwardly from a guide groove 86 as shown in FIG. 4, of the base block 80.

As shown in FIG. 3, a generally L-shaped lever 88 is connected with the end 76B of the manual lock release rod 76 for unitary motion therewith. The L-shaped lever 88 is pivotally supported about a pin 90 which is disposed adjacent the guide groove 86 of the base block 80. The L-shaped lever 88 is biased clockwise by a spring 92 one end of which is mounted in a notch 94 of the base block 82. The L-shaped lever 88 has a distal end portion opposed to the radially outwardly extending flange 74 of the lock bushing 54.

As seen in FIG. 3, the base block 80 is supported on a bracket 96 which is secured to the hollow cylindrical shaft 12 in such a manner as welding. As best seen in FIG. 4, the bracket 96 has a recess 98 at a peripheral edge thereof. The recess 98 receives the end 38A of the position pin 38 which is placed in the upper most position as viewed in FIG. 4, in the slot 40. The bracket 96 has a tab portion 100 with an opening 102. The tab portion 100 is engaged with a groove 104 of the base block 80. The base block 80 is secured to the bracket 96 by means a fastening screw 106 inserted through an opening 108 of the base block 80 and the opening 102 of the bracket 96.

Figure 4:
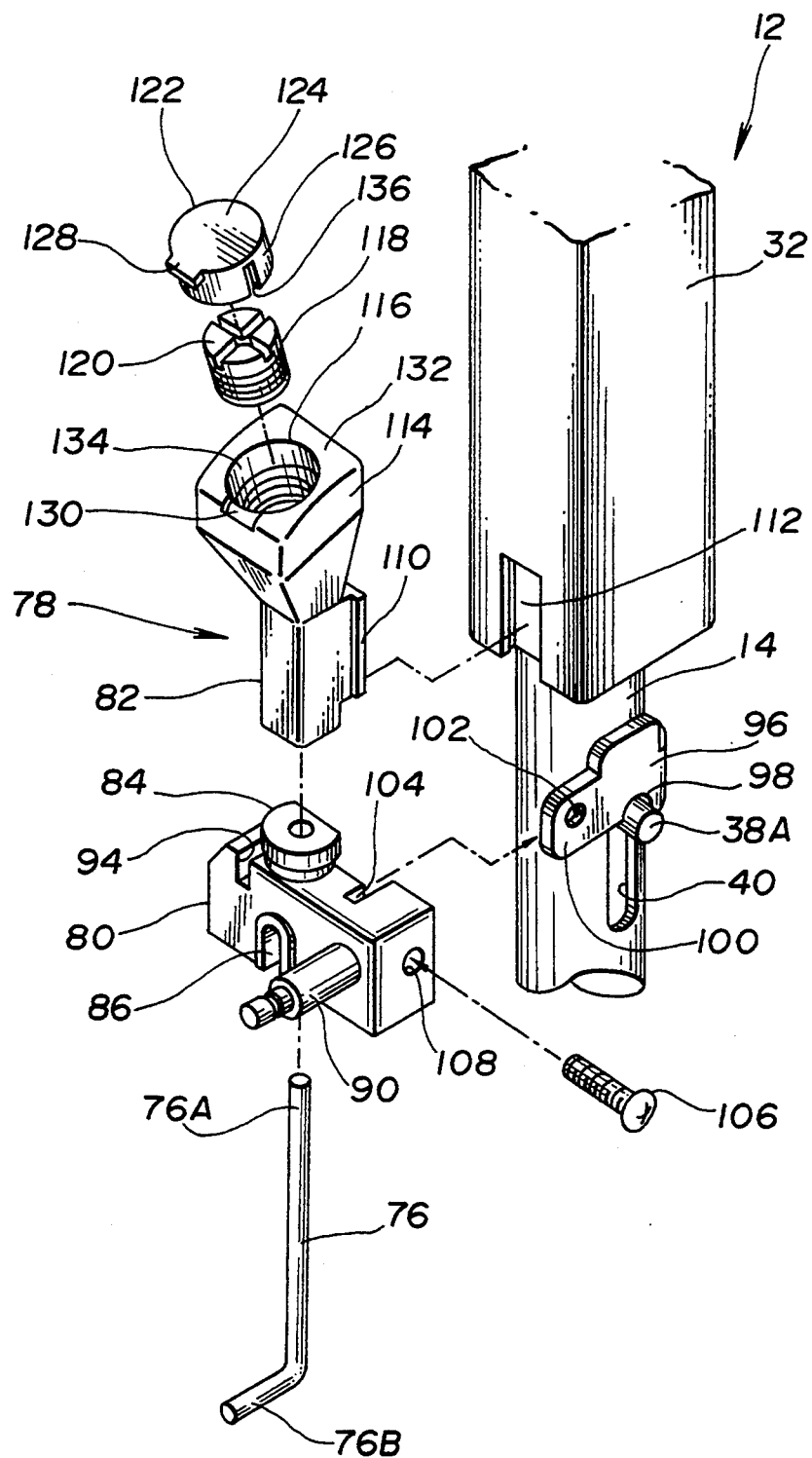
FIG. 4 is an exploded view of FIG. 3 showing a manual lock release rod and a casing therefor.

As shown in FIGS. 3 and 4, the post block 82 is connected with the knob 32 of the gear shift lever 12 by engagement between a slide portion 110 formed on one side wall of the post block 82 and a groove 112 formed on the knob 32. The post block 82 includes a prismatic body portion and a head portion 114 joined with the body portion. The head portion 114 has a partly threaded opening 116 as seen in FIG. 4. A screw 118 of a cylindrical shape is received in the opening 116 in a threaded engagement relationship and opposed to the end 76A of the manual lock release rod 76 as indicated in a phantom line in FIG. 3. The screw 118 has a top face 120 with a cross recess engageable by a tool as indicated in a phantom line F of FIG. 3. A shape of the recess is not limited to the cross recess in this embodiment. Thus, the screw 118 is engaged with and disengaged from the opening 116 by using the tool. The screw 118 interrupts an access through the opening 116 to the end 76A of the manual lock release rod 76.

As shown in FIG. 3, a lid 122 is fitted to the opening 116 to cover the top face 120 of the screw 118. As seen in FIG. 4, the lid 122 has a circular top wall 124 and a cylindrical side wall 126 extending from a periphery of the top wall 124. An integral tab 128 projects radially outwardly from a peripheral portion of the top wall 124. The tab 128 is engaged with a recess 130 formed on an end face 132 of the head portion 114 of the post block 82. The tab 128 has an end portion extending outwardly slightly beyond the recess 130. With the provision of the tab 128, the lid 122 is readily operated for its removal from the opening 116.

Referring back to FIG. 3, the top wall 124 with the tab 128 is generally flush with the end face 132 of the head portion 114 when the lid 122 is fitted to the opening 116. The side wall 126 is generally equivalent in width to a non-threaded portion 134 of the opening 116. As seen in FIG. 4, the side wall 126 is formed with a slit 136 extending from a peripheral edge thereof toward the top wall 124, which serves for abutting engagement between the side wall 126 and the non-threaded portion 134 of the opening 116.

Figure 5:
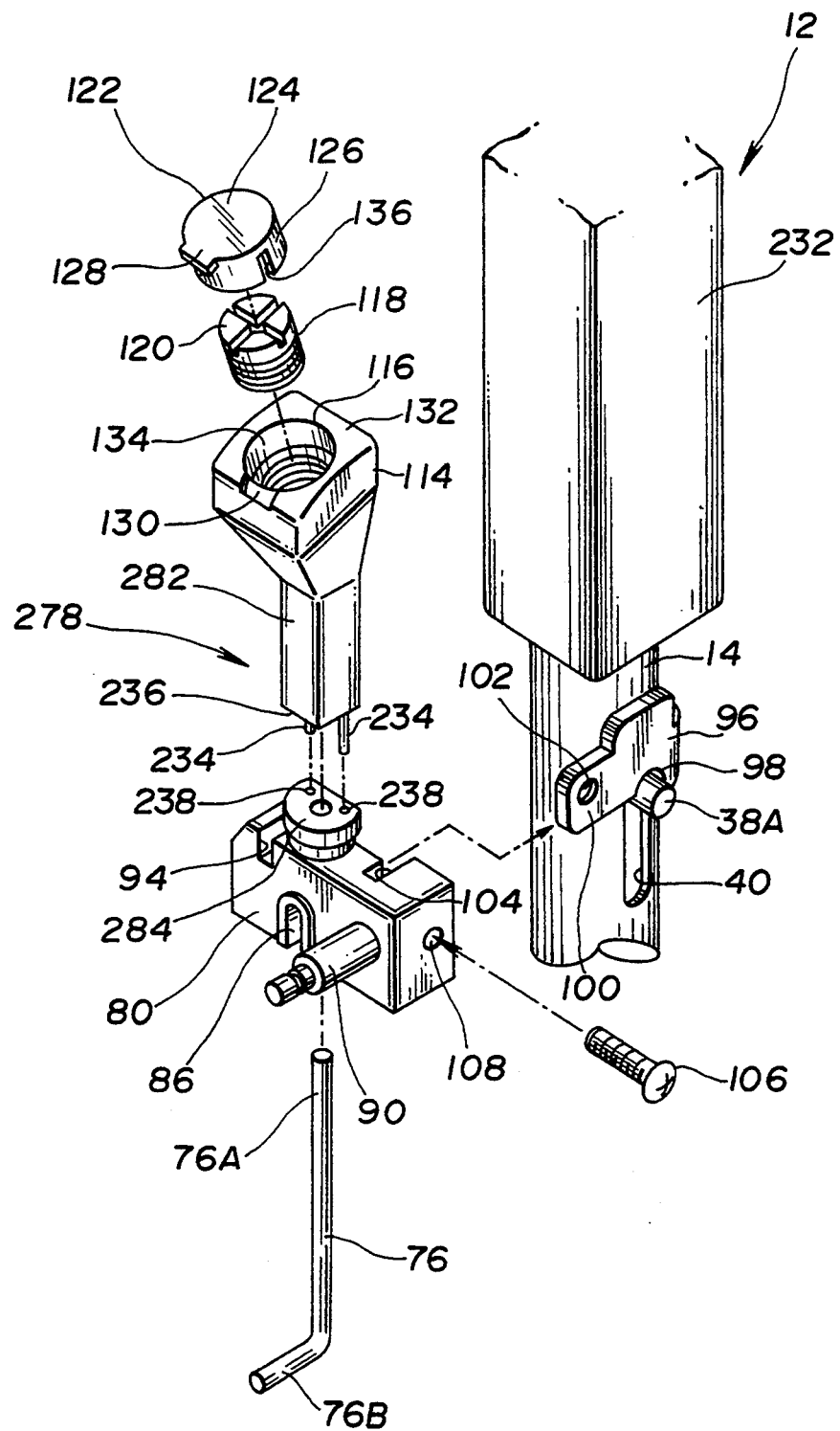
FIG. 5 is a view similar to FIG. 4 showing a modified casing.

Referring to FIG. 5, there are shown a modified knob 232 and a modified casing 278 including a hollow post block 282 and an annular washer 284. The knob 232 is similar to the knob 32 except no provision of the groove 112. The casing 278 differs from the casing 78 in that the post block 282 is formed with a pair of diametrically opposed pins 234 on a bottom face 236 thereof instead of the slide portion 110 of the post block 82, and the washer 284 has a pair of holes 238 engaged with the pins 234. Therefore, like numerals denote like parts. The provision of the pins 234 and the holes 238 serves for ready positioning the post block 282 on the base block 80.

Figure 6:
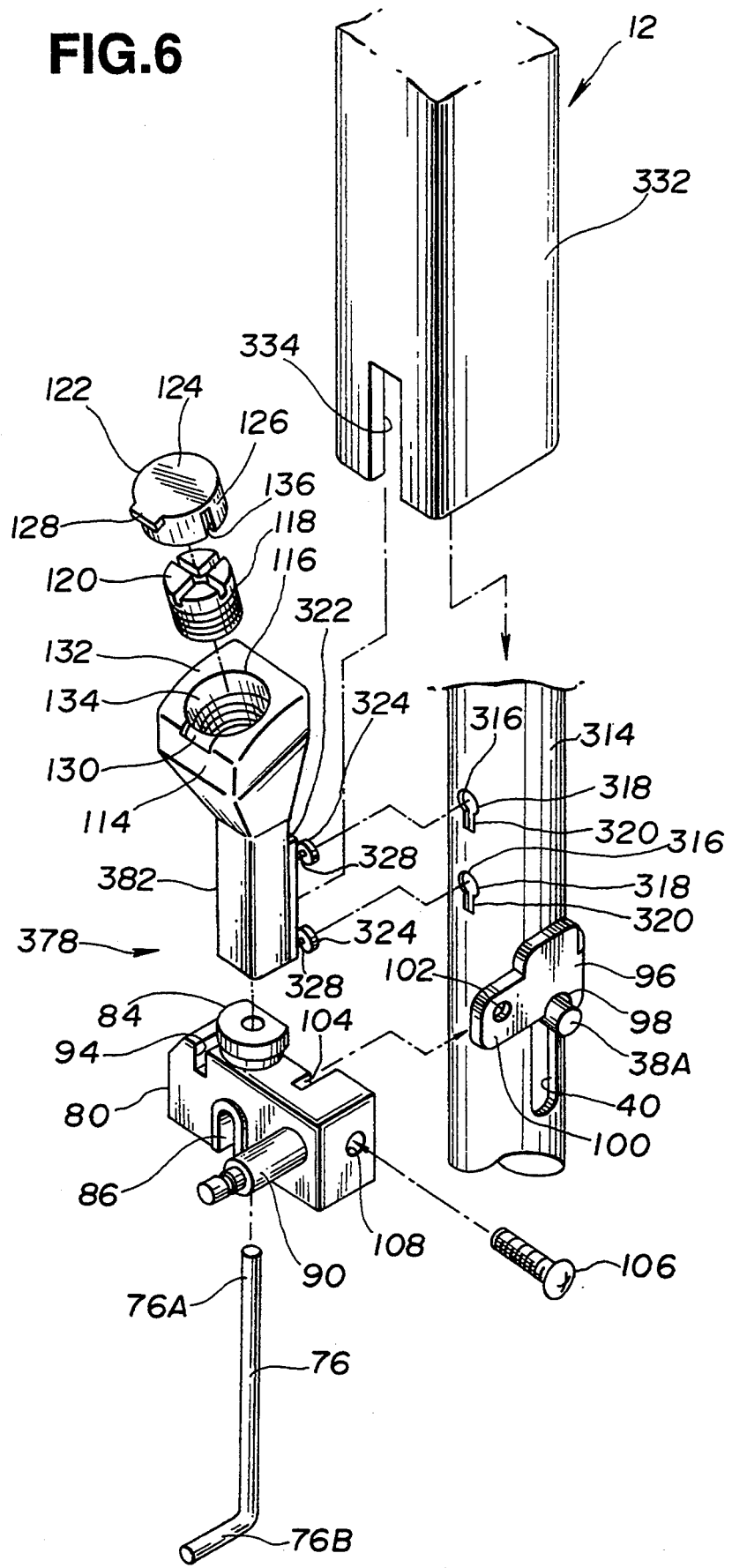
FIG. 6 is an exploded view showing another modified casing.

Referring to FIG. 6, there are shown another modified hollow cylindrical shaft 314, knob 332, and casing 378. Like numerals denote like parts and therefore the detailed explanations thereabout are omitted. The hollow cylindrical shaft 314 is similar to the hollow cylindrical shaft 14 except the provision of axially spaced openings 316 as seen in FIG. 6. Each of the opening 316 includes a larger circular portion 318 and a smaller rectangular portion 320 and receives two spaced pins 324 of a hollow post block 382 of the casing 378. The pins 324 are formed on an integral support 322 which projects outwardly from a side wall of the post block 382. The casing 378 differs from the casings 78 and 278 in the provision of the integral support 322 and pins 324 on the post block 382. Each of the pins 324 includes a larger diameter head portion 326 and a smaller diameter neck portion 328 connected with the head portion 326. The head portion 326 is inserted into the circular portion 318 of the opening 316 and then the neck portion 328 is engaged with the rectangular portion 320 of the opening 316. By this engagement, the post block 382 is supported on the hollow cylindrical shaft 314. As seen in FIG. 6, the integral support 322 is received in a guide groove 334 of the knob 332 in the provision of which the knob 332 is different from the knobs 32 and 232.

Figure 9:
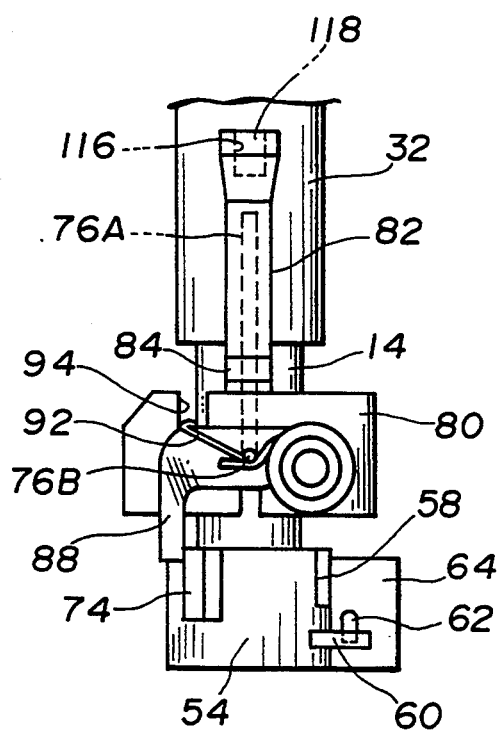
FIG. 9 is a side elevation viewed in a direction of the arrow IX of FIG. 3, showing the manual lock release rod when unactuated.
Figure 10:
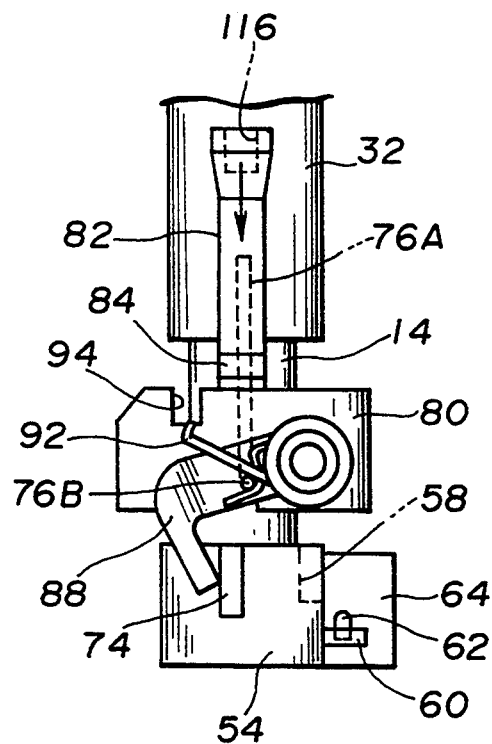
FIG. 10 is a view similar to FIG. 9 but showing the manual lock release rod when actuated.

Referring to FIGS. 9 and 10, a lock release operation by actuating the manual lock release rod 76 is explained. As shown in FIG. 9, an access to the manual lock release rod 76 is interrupted by the screw 118 engaged with the opening 116 of the post block 82. Therefore, the manual lock release rod 76 is unactuated and the L-shaped lever 88 does not urge the flange 74 of the lock bushing 54. As seen in FIG. 10, when the lid 122 and the screw 118 are removed from the opening 116 by using the tool, the access to the manual lock release rod 76 through the opening 116 is allowed. When the end 76A of the manual lock release rod 76 is depressed by using the tool downwardly as indicated by an arrow of FIG. 10, the L-shaped lever 88 connected with the other end 76B of the manual lock release rod 76 is rotated counterclockwise to urge the flange 74 of the lock bushing 54. This causes the lock bushing 54 to shift from the lock position as seen in FIG. 7, into the lock release position as seen in FIG. 8. In this condition, the detent mechanism is allowed to shift into the detent position whereby the gear shift lever 12 is allowed to move out of the parking position.

When the end 76A of the manual lock release rod 76 is released from the depression force, the L-shaped lever 88 is rotated clockwise by the biasing of the spring 92 and then returns to an initial position as seen in FIG. 9.

Figure 11:
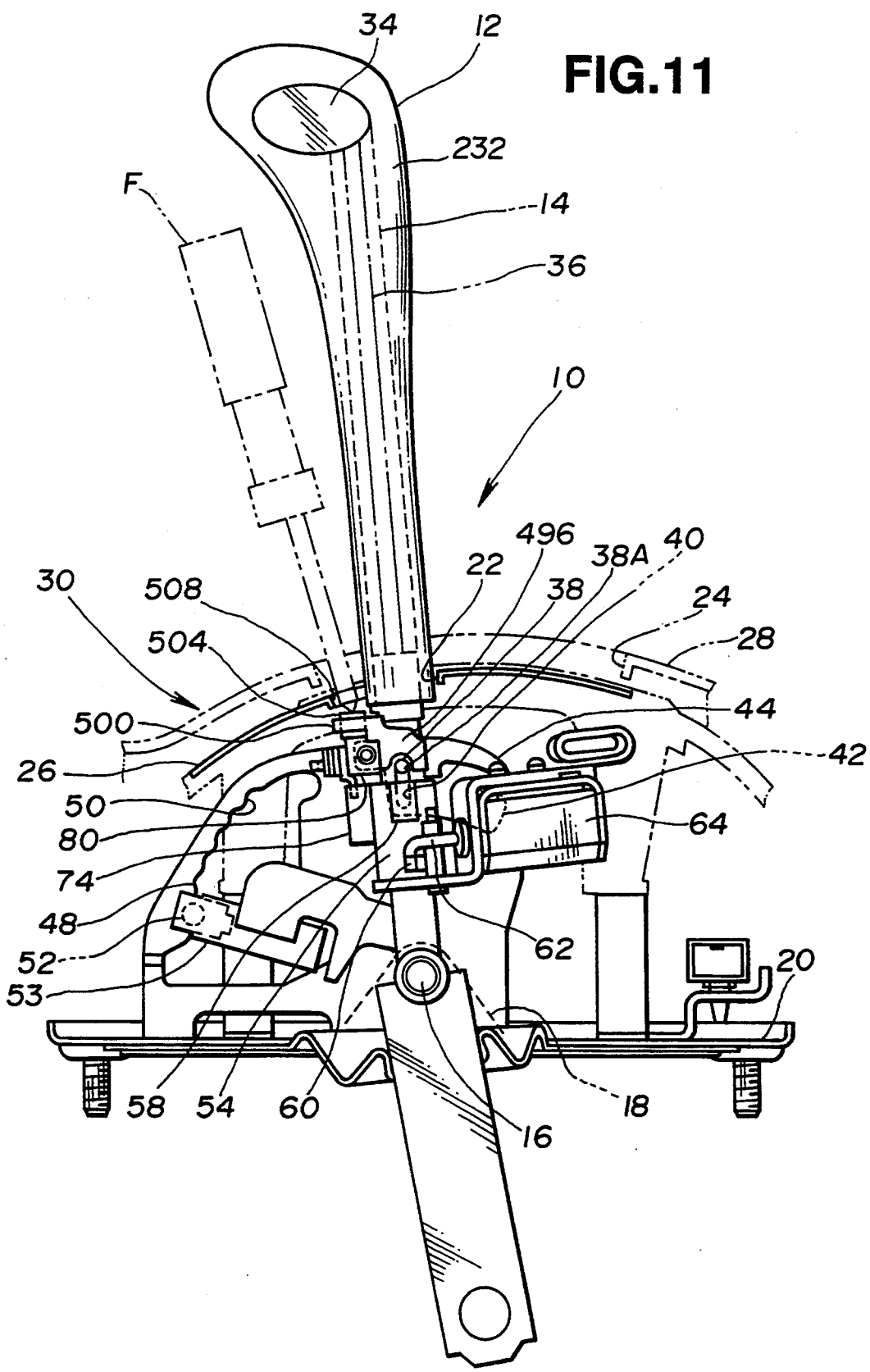
FIG. 11 is an elevation partly in section showing another embodiment of the present invention.
Figure 12:
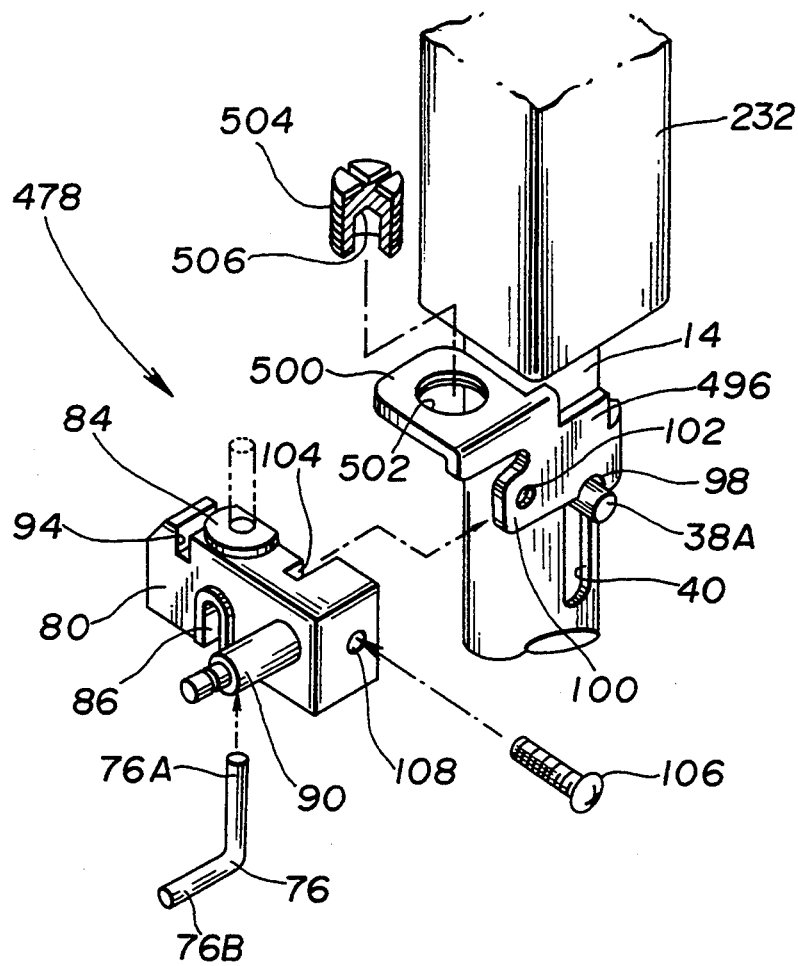
FIG. 12 is an exploded view of essential parts of the embodiment of FIG. 11, showing a manual lock release rod and a casing therefor.
Figure 13:
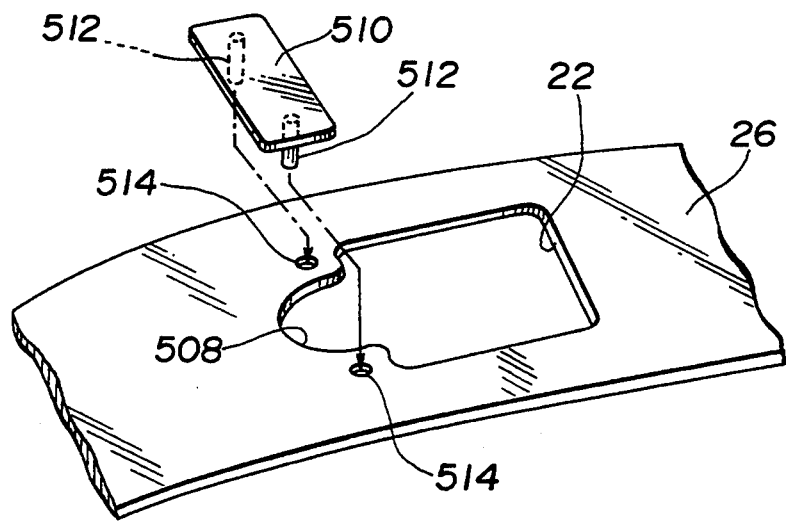
FIG. 13 is a view similar to FIG. 12 but showing a lid.

Referring to FIGS. 11–13, there is shown another embodiment employing a casing 478, a bracket 496, a screw 504 with a cross recessed top face, and a lid 510, in which like numerals are used for like parts and therefore the detailed explanations thereabout are omitted. The casing 478 is similar to the casing 78 except deletion of the post block 82 but entirely accommodated within the shifter assembly case 30. The knob 232 is similar to that of FIG. 5 without any groove engaged with the slide portion of the post block. As best shown in FIG. 12, the bracket 496 includes a lateral support 500 extending laterally from an upper edge as viewed in FIG. 12, of the tab portion 100. The lateral support 500 is formed with a threaded opening 502 engaged threadedly with the screw 504. The screw 504 is formed with a center groove 506 extending inwardly from a bottom face thereof. Received in the groove 506 is the end 76A of the manual lock release rod 76 which projects out of the washer 84 fixed on the base block 80.

The screw 504 is opposed to a semicircular opening 508 of the slide panel 26 as shown in FIG. 11. As best shown in FIG. 13, the opening 508 is connected to the rectangular opening 22 on the slide panel 26 and covered by a rectangular lid 510. The lid 510 has on opposite sides thereof two pins 512 engaged with holes 514 disposed adjacent the opening 508 on the slide panel 26. Thus, the lid 510 covers the opening 508 of the slide panel 26 and the screw 504 opposed to the opening 508.

What is claimed is:

1. A lock release apparatus comprising:
    a gear shift lever assembly including a gear shift lever having a plurality of positions including a parking position, and a detent mechanism shiftable into a detent position wherein said gear shift lever is allowed to move out of said parking position;
    a lock having a lock position in which said detent mechanism is prevented from shifting into said detent position and a lock release position in which said detent mechanism is allowed to shift into said detent position;
    means adapted for conditioning said lock into said lock release position;
    a manual lock release for said lock;
    means for preventing access to said manual lock release, said preventing means including a casing secured to said gear shift lever for a unitary motion therewith, said casing defining an opening arranged to allow access to said manual lock release and accommodating said manual lock release; and
    a lid covering said opening.

2. A lock release apparatus as claimed in claim 1, wherein said preventing means includes a screw so arranged as to interrupt said access to said manual lock release through said opening.

3. A lock release apparatus as claimed in claim 2, wherein said screw is engaged with and disengaged from said opening by using a tool.

4. A lock release apparatus as claimed in claim 2, wherein said screw is formed with a groove receiving a portion of said manual lock release.

* * * * *